US010315369B2

(12) United States Patent
Sutter

(10) Patent No.: US 10,315,369 B2
(45) Date of Patent: Jun. 11, 2019

(54) ADHESIVE-DISTRIBUTING DEVICE AND METHOD FOR ADHESIVELY BONDING HOLLOW PROFILES USING THE ADHESIVE-DISTRIBUTING DEVICE

(71) Applicant: Bayerische Motoren Werke Aktiengesellschaft, Munich (DE)

(72) Inventor: Nathanael Sutter, Hoehenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/356,716

(22) Filed: Nov. 21, 2016

(65) Prior Publication Data
US 2017/0066205 A1 Mar. 9, 2017

Related U.S. Application Data

(63) Continuation of application No. PCT/EP2015/068945, filed on Aug. 18, 2015.

(30) Foreign Application Priority Data

Sep. 4, 2014 (DE) .................. 10 2014 217 724

(51) Int. Cl.
*B05D 5/10* (2006.01)
*B05D 7/22* (2006.01)
(Continued)

(52) U.S. Cl.
CPC .............. *B29C 73/025* (2013.01); *B05B 1/14* (2013.01); *B05B 13/0618* (2013.01);
(Continued)

(58) Field of Classification Search
CPC .. B05D 1/26; B05D 5/005; B05D 7/22; B29C 73/025; B05B 1/14; B05B 13/0618;
(Continued)

(56) References Cited

U.S. PATENT DOCUMENTS 5,393,095 A 2/1995 Kreis et al.
6,036,397 A * 3/2000 Goto .................. F16B 11/006
403/265

(Continued)

FOREIGN PATENT DOCUMENTS

CN 102019966 A 4/2011
DE 7322123 U 2/1974
(Continued)

OTHER PUBLICATIONS

International Search Report (PCT/ISA/210) issued in PCT Application No. PCT/EP2015/068945 dated Oct. 20, 2015 with English translation (six pages).

(Continued)

*Primary Examiner* — Kirsten Jolley
(74) *Attorney, Agent, or Firm* — Crowell & Moring LLP

(57) ABSTRACT

An adhesive-distributing device for use in repairing or reconditioning a hollow profile includes an adapter body, in which is arranged at least one channel system made up of at least two channels connected to one another. At least one channel is connected to an injection opening for injecting adhesive into the channel system. Each channel is designed with at least one exit opening.

4 Claims, 1 Drawing Sheet

(51) Int. Cl.
*B29C 73/02* (2006.01)
*B05B 1/14* (2006.01)
*B05B 13/06* (2006.01)
*B05C 7/00* (2006.01)
*B62D 27/02* (2006.01)
*F16B 11/00* (2006.01)
*B05D 1/26* (2006.01)
*B05C 17/005* (2006.01)
*B29L 22/00* (2006.01)

(52) U.S. Cl.
CPC ............ *B05B 13/0627* (2013.01); *B05C 7/00* (2013.01); *B05D 1/26* (2013.01); *B05D 7/22* (2013.01); *B62D 27/026* (2013.01); *F16B 11/008* (2013.01); *B05C 17/00516* (2013.01); *B29L 2022/00* (2013.01)

(58) Field of Classification Search
CPC . B05B 13/0627; B05C 7/00; B05C 17/00516; B62D 27/026
USPC .............................................. 427/230, 207.1
See application file for complete search history.

(56) References Cited

U.S. PATENT DOCUMENTS

| | | |
|---|---|---|
| 2011/0158741 A1 | 6/2011 | Knaebel |
| 2014/0202615 A1* | 7/2014 | Cuddy ................... F16B 5/01 156/66 |
| 2015/0137419 A1 | 5/2015 | Ullmann et al. |

FOREIGN PATENT DOCUMENTS

| | | |
|---|---|---|
| DE | 44 22 526 A1 | 1/1996 |
| DE | 195 20 065 A1 | 12/1996 |
| DE | 10 2012 012 298 A1 | 12/2013 |
| EP | 0 561 800 B1 | 8/1994 |
| EP | 1 553 311 A2 | 7/2005 |
| EP | 2 301 826 A1 | 3/2011 |
| FI | 89406 B | 6/1993 |
| JP | 2013-170672 A | 9/2013 |
| WO | WO 93/18311 A1 | 9/1993 |
| WO | WO 2013/189572 A1 | 12/2013 |

OTHER PUBLICATIONS

German-language Written Opinion (PCT/ISA/237) issued in PCT Application No. PCT/EP2015/068945 dated Oct. 20, 2015 (six pages).

German Search Report issued in counterpart German Application No. 10 2014 217 724.3 dated May 18, 2015 with partial English translation (10 pages).

Chinese Office Action issued in Chinese counterpart application No. 201580030780.7 dated May 4, 2018, with English translation (Fourteen (14) pages).

Chinese Office Action issued in Chinese counterpart application No. 201580030780.7 dated Jan. 23, 2019, with English translation (Fifteen (15) pages).

* cited by examiner

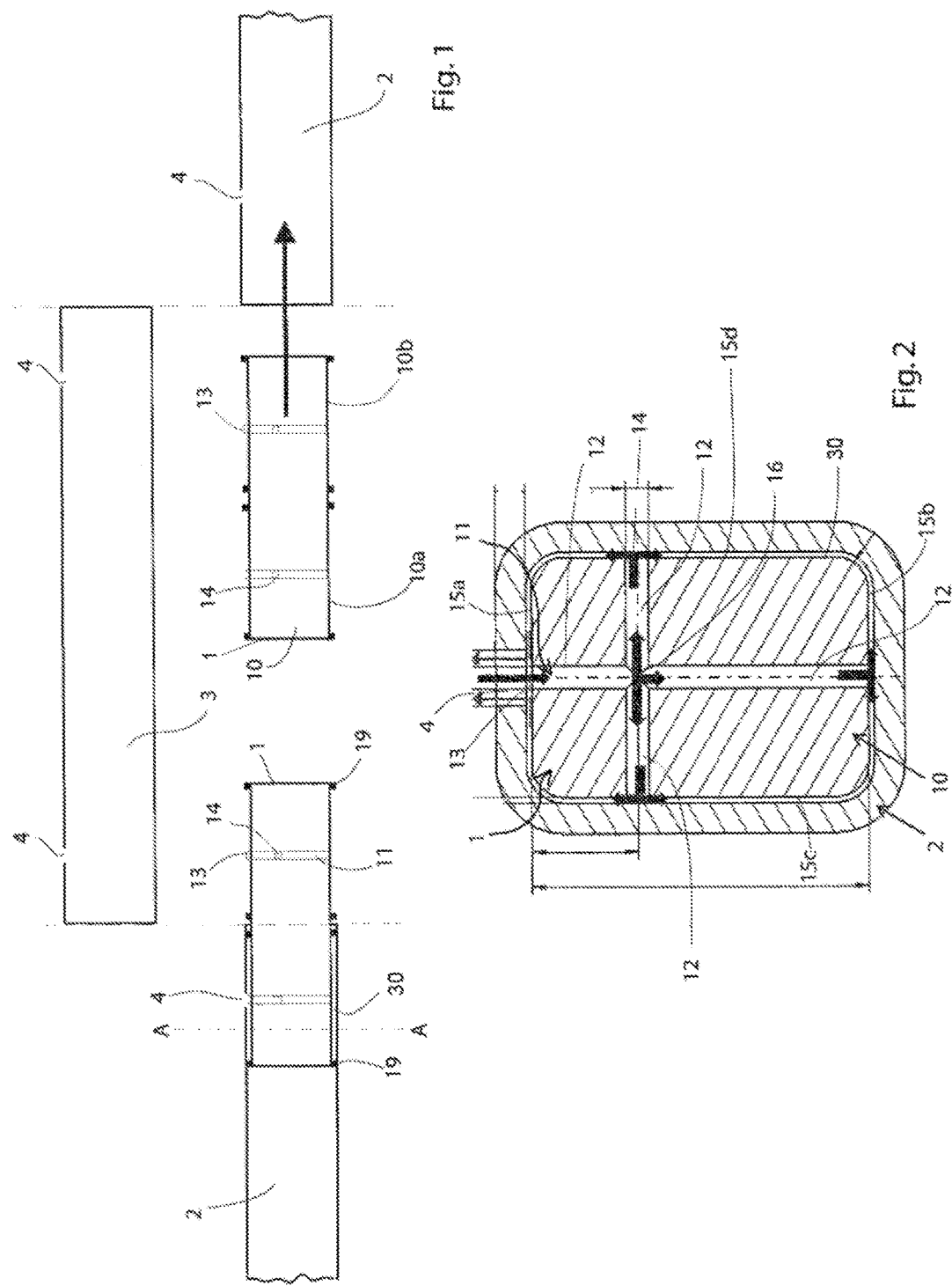

ADHESIVE-DISTRIBUTING DEVICE AND METHOD FOR ADHESIVELY BONDING HOLLOW PROFILES USING THE ADHESIVE-DISTRIBUTING DEVICE

CROSS REFERENCE TO RELATED APPLICATIONS

This application is a continuation of PCT International Application No. PCT/EP2015/068945, filed Aug. 18, 2015, which claims priority under 35 U.S.C. § 119 from German Patent Application No. 10 2014 217 724.3, filed Sep. 4, 2014, the entire disclosures of which are herein expressly incorporated by reference.

BACKGROUND AND SUMMARY OF THE INVENTION

The present invention relates to an adhesive-distributing device as well as to a method for bonding together hollow profiles with an adhesive-distributing device. The present invention therefore relates, in particular, to an adhesive-distributing device for use in repairing or reconditioning a hollow profile, consisting of an adapter body, in which at least one channel system made up of at least two channels connected to one another is arranged.

A hollow profile in terms of the present invention refers to all complex profile geometries, from the simple basic forms "round", "square", "rectangular" as well as forms (closed circumference) deviating therefrom, such as oval, for example, and profiles that have at least in sections such a closed-circumference hollow profile section, preferably at the end side.

In general, structural profiles used in automotive and aircraft engineering are increasingly made of fiber composite material. In automotive engineering, there is a desire to use light but very firm profiles that can sustain the expected loads. However, it is more and more the case that an installed structural profile has to be repaired because of damage, accidents or other influences. The profile sections subject to the maintenance action then have to be reliably repaired at the damaged points.

A method is known from EP 0 561 800 B1, for example, where a damaged longitudinal support is first separated from a junction element at its connecting point to the junction element and then replaced with a new support. The new support is fastened at the junction plate via an inserted mother plate with screws that intersperse the flange of the junction element as well as the new support. However, such known connecting solutions offer advantages primarily in case of aluminum alloys and metal profiles because this can avoid a connection via fusion welding and a decrease in firmness in the welding zone. Many other repair methods are mentioned in the prior art, where typically a mechanical connecting element, such as a connecting sleeve, a doppler, a connecting adapter or the like are used to attach a repair profile thereto. However, for various reasons, these measures are not suitable for use in automotive engineering to repair plastic composite profiles. One disadvantage, for example, is the lack of accessibility to insert and attach the connecting adapters in the first place because they cannot be attached outside at the profile, but rather have to be inserted in such a fashion that they do not visibly change the outer contour of the vehicle at that point.

In automotive engineering, composite profiles are increasingly adhesively bonded together during repair. One measure known in the prior art is injection bonding.

Injection bonding is a production process where a liquid material, specifically an adhesive, is filled, which is to say injected, into a firmly enclosed space to harden there. Unlike other typical bonding methods, the adhesive is applied only after the components to be joined have been connected. In injection bonding, for example, the hydrostatic pressure or the capillary forces are used to obtain the distribution of the adhesive. Unlike with mating surface production, in injection bonding, a bonding to the affected surfaces is desired.

The published German patent application DE 102012012298 A1 discloses an injection bonding method and a corresponding bonding device to adhesively bond together assembly parts which have adhesive surfaces at their face surfaces to be joined, in particular for bonding together rotor blade half cups into a rotor blade for a wind power plant. It proposes to adhesively bond the assembly parts together by injection bonding, with an adhesive being injected into a glue joint between the adhesive surfaces of the assembly parts.

With injection bonding, completely filling the injection space intended for the adhesive is problematic. The fact that the capillary effects, the profile geometry, the surface properties of the bonding surfaces and the viscosity of the adhesive represent influencing variables, resulted in the disadvantage with injection bonding that an insufficient introduction of adhesive often leads to a failed bonding or the bonding does not develop satisfactorily. Because composite materials such as carbon fiber reinforced composite materials (CFK materials) with complex geometries are increasingly used in automotive engineering, this disadvantageous effect is even greater.

Furthermore, with injection bonding of CFK hollow profile components in automotive engineering, seals or sealing elements are used to prevent an undesired escape of adhesive during the injection bonding. With this repair process, the damaged hollow profile is opened in the section to be repaired and then a repair profile is inserted into the hollow profile. The repair profile has an end-side mounting section with seals, preferably two seals, which delimit the space for injecting adhesive laterally and seal the connecting surfaces to be bonded together in an axial insertion direction and toward the interior of the profile. The space created between the seals is then filled with adhesive via a suitably attached injection opening, typically with an adhesive thickness that corresponds approximately to the thickness of the compressed seal.

In addition to the disadvantages of sufficient filling mentioned above, there are a number of other practical problems with the conventional injection bonding methods. This includes the following disadvantages:

Again and again, high injection pressures during injection of the adhesive leads to a failure of the seals;

the mechanical interaction and the functionality of the seals during the joining of the components is also determined by the tolerance chain between the external diameter and the internal diameter of the respective profiles and the tolerance of the seal;

when assembling the repair profiles, it may happen that the seals adhere too close to the mating seal face, which means that a simple joining is not at all possible, or only with great difficulty, without damage to, or an undesired displacement of, the seals, as well as a "shearing" joining, which is to say, the lateral insertion of a repair profile of the same profile length as the removed profile section, is not possible.

Furthermore, it must be taken into account that repairs also have to be performed onsite at places that are difficult to access, which significantly complicates the aforementioned assembly and repair situations. An insufficient bonding leads to secondary damages, and remedying them in turn requires a high effort in terms of cost and work.

Given this background, the problem to be solved by the present invention is to overcome the aforementioned disadvantages and to provide a simple, reliable and universal method, as well as a device, for connecting hollow profiles (in particular for a repair action). In automotive repairs of plastic composite components, there is furthermore the desire to use reproducible and standardized repair methods to ensure the quality and reliability of a repair.

This and other objects are achieved by an adhesive-distributing device for use in the repair or reconditioning of a hollow profile. The device includes an adapter body in which at least one channel system having at least two interconnected channels is arranged. At least one channel is connected to an injection opening for injecting adhesive into the channel system. Each channel is developed with at least one exit opening. The objects are also achieved by a method for connecting such profiles with such a device.

The basic idea of the present invention is to apply the adhesive not only via an injection opening into the adhesive gap between the adhesive surfaces, as it is known from prior art, but rather to provide an adhesive-distributing device with an integrated channel system for the specific, multi-directional distribution of the adhesive, wherein the channel system has a plurality of specifically positioned exit openings (outlets) that thus lead the adhesive to the various positions in the bonding gap. In this way, an even and complete filling of the bonding cavity, which is to say the entire bonding gap, is obtained. The adhesive can distribute evenly along flow fronts according to the number of exit openings in the channel system.

According to the invention, an adhesive-distributing device is therefore used for the repair or reconditioning of a hollow profile comprising an adapter body in which at least one channel system having at least two interconnected channels is arranged, wherein at least one channel is connected to an injection opening to inject adhesive into the channel system; wherein furthermore each channel is developed with at least one exit opening. The adapter body can be developed of any suitable material, but preferably of a material that is light and easy to work with. The channel guide and the position of the exit opening can be suitably selected as a function of the profile geometry.

In an advantageous embodiment of the invention, the adapter body has two injection openings and two channel systems, one in each respective section of the adapter body on the insertion side. This is useful in that a repair profile can be connected to a hollow profile to be repaired according to the invention in a simple and secure manner. To that end, the adapter is comprised of a first section with a first channel system, which is to be placed into the face-side end section of the hollow profile to be repaired, whereas the other section is to be placed into the repair profile.

It is furthermore advantageously provided that the channel system(s) is/are developed as multi-directional channel systems that can guide an adhesive injected through the respective injection opening into different spatial directions to the lateral surfaces of the adapter body. Especially preferred is a development of the channels where the respective exit opening is developed in an associated lateral surface of the adapter body.

In an advantageous embodiment of the invention, two or more of the respective channels of the channel system are interconnected via at least one connecting point or a multi-directional junction so that the channel system can effect the distribution of the adhesive via only one common injection opening. For example, two channels can run vertically through the adapter and two additional channels can run horizontally through the adapter, with the four channels merging at one common junction. The opening for injecting the adhesive is on one of the channels. The three other channels run into the respective lateral surfaces where the exit openings of the respective channels are located.

It is furthermore advantageously provided that the adapter body has external circumferential webs, two each adjacent to the injection opening(s), along its lateral surfaces (this means, those surfaces that are opposite the interior wall surfaces of the hollow profile in inserted condition and form the bonding gap). In this way, the webs generate a grading and delimitation at the face sides of the adhesive-distributing device. In an especially advantageous embodiment of the invention, the webs are dimensioned and formed such that they adhere to the inner contour of the hollow profile to be repaired as soon as the adapter body has been fitted into the hollow profile. In this way, the two webs delimit the bonding gap in and against the fitting direction, which causes a bonding cavity to be formed and which allows injected adhesive to distribute only within the bonding cavity. However, in as far as a minimal or defined relatively small air gap remains between the webs and the inner wall as per specification or because of component tolerances, the webs nevertheless act as a barrier. In that case, which is less advantageous, it may be that a small amount of adhesive escapes through the remaining gaps into the interior of the hollow profiles. Furthermore, it may be provided that instead of the two webs, elastic sealing lips are provided at the outer circumference of the adapter body, which in the fitted state adhere in a sealing fashion to the inner wall of the hollow profile.

Another aspect of the present invention relates to a method for repairing a hollow profile with a repair profile, preferably such as a fiber composite hollow profile of a vehicle, for example. In the repair process, the damaged hollow profile is opened in the section to be repaired and then a repair profile is inserted into the hollow profile and, with the help of an adhesive-distributing device as described above, bonded to the profiles, with the method being performed with at least the following steps:

a. Providing a suitable adhesive-distributing device for the present repair job, with the adhesive-distributing device having an outer contour that corresponds to the inner contour of the hollow profile to be repaired or the repair profile, but which outer contour has a smaller cross-section;

b. Introducing one or a plurality of wall-side openings into the hollow profile and/or repair profile, corresponding to the number of the existing injection openings of the adhesive-distributing device;

c. Introducing the adhesive-distributing device with one each connecting section into the hollow profile as well as into the repair profile in such a fashion that each of the openings introduced in step b) are in alignment with the corresponding injection opening(s), specifically forming a circumferential bonding gap;

d. Injecting an adhesive via the injection openings into the channel system(s) of the adhesive-distributing device until the bonding gap and/or the bonding cavity is completely filled with adhesive.

An especially advantageous embodiment of the invention relates to "shearing", which is to say, the lateral fitting of the repair profile into the hollow profile to be repaired. In so doing, step c) is broken down into three steps, wherein in a first step, the adhesive-distributing device is completely inserted into one of the two profiles; in a second step, the two profiles are positioned relative to one another (flush on their face side); and in a third step, the adhesive-distributing device is inserted into the other profile or pulled out of the other profile far enough so as to create an internal connection between the profiles. In doing so, the adhesive-distributing device is displaced far enough until the respective specific opening in the profiles is in alignment with the respective corresponding injection opening.

Especially preferred is an embodiment where the cross-section of the opening is greater in the respective profiles than the opening cross-section of the corresponding entry opening so that immediately after the bonding gap has been completely filled in step d), excess adhesive exits the respective opening.

A further aspect of the present invention relates to a repair profile consisting of a hollow profile section and an adhesive-distributing device connected to the hollow profile section, as described in greater detail above. In this way, the repair profile and the adhesive-distributing device can be united in one component so that the repair profile already has a corresponding integrated adapter body with a channel system for distributing the adhesive.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic side view of a hollow profile opened in the center, with a repair profile and two adhesive-distributing devices according to an embodiment of the invention.

FIG. 2 is a schematic sectional view taken along section A-A in FIG. 1, where the adhesive-distributing device has been partially introduced into the hollow profile, which is also shown.

DETAILED DESCRIPTION OF THE DRAWINGS

FIG. 1 shows a schematic lateral view of a hollow profile 2 that is opened in the center and from which a hollow profile section (not shown) was removed for repair or reconditioning purposes. Above the removed section, a repair profile 3 of a fitting length is shown. Furthermore, two adhesive-distributing devices 1 according to the invention are shown, of which the left adhesive-distributing device 1 is partially introduced into the hollow profile 2.

The adhesive-distributing device 1 is shown in FIG. 2 in a sectional view along the sectional line A-A in FIG. 1. The adhesive-distributing device 1 shown in FIG. 2 is comprised of an adapter body 10, in which two separate channel systems 11 are provided in a respective left and right adapter body section 10a, 10b, as shown schematically in FIG. 1.

The channel system 11 is comprised of four interconnected channels 12, of which two each run vertically and two each run horizontally through the adapter body 10. The four channels 12 meet at a joint junction 16. The channel 12 coming from the top is connected to the channel system 11 with an injection opening 13 for injecting adhesive. It is furthermore shown that each of the three additional channels 12 is developed with an exit opening 14.

Consequently, each channel system 11 forms a multidirectional channel system 11. Through the injection openings 13 located below the openings 4, adhesive is injected into the respective upper channel 12. The adhesive distributes according to the flow movements indicated by arrows in the bonding gap 3 in the different spatial directions.

The injected adhesive can reach the exit openings 14 in the lateral surfaces 15a, 15b, 15c, 15d of the adapter body 10 in various directions. It is furthermore shown that the channels 12 developed horizontally in the adapter body 10 are not attached centrally in the adapter body but rather in the upper third of the adapter body. After injecting adhesive, this leads to a flow behavior where first the upper vertical channel 12 is filled, then the two horizontal channels 12, and then the adhesive exits at the sides of the adapter body into the bonding gap 30. In the bonding gap 30, flow fronts are formed according to the flow movement of the adhesive. After adhesive also exits from the lower vertical channel 12 through the exit opening 14 out of the lower lateral surface 15b, the flow fronts of the adhesive exiting the exit openings 14 approach each other and first meet in the lower corners, to then fill the upper part of the bonding cavity as well.

Adhesive is effectively prevented from escaping at the sides (which is to say, exiting into and against the horizontal arrow direction in FIG. 1 in that the adapter body 10 has two circumferential webs 19 as barriers along the circumference of the lateral surfaces 15a, 15b, 15c, 15d, specifically respectively adjacent to the two injection openings 13.

The cross-section of the respective opening 4 is enlarged relative to the respective injection opening 13 so that after the bonding gap 3 has been completely filled, excess adhesive exits the opening 14 so that the opening 14 simultaneously also functions as an indicator opening.

With reference to FIG. 1, the method for repairing a hollow profile 2 with a repair profile 3 with the shown adhesive-distributing devices 1 can be explained as follows:

The two adhesive-distributing devices 1 have an outer contour that essentially corresponds to the inner contour of the hollow profile 2 to be repaired and the repair profile 3, but have a smaller cross-section. The wall-side openings 4 are introduced into the hollow profile 2 and into the repair profile 3. Then, the adhesive-distributing devices 1 are introduced with their connecting section 10a into the hollow profile 2 and with their connecting section 10b into the repair profile 3 in such a fashion that the respective openings 4 are in alignment with each of the corresponding injection openings 13.

Then an adhesive is injected via the injection openings 13 into the channel systems 11 until the respective bonding gap 30 is completely filled with adhesive.

The invention is not limited in its execution to the preferred embodiments described above. Rather, a number of variants are contemplated, which may take advantage of the represented solution even if they are basically of a different type. For example, the adhesive-distributing device may only have one single channel system (which is to say, one channel system shared by the hollow profile and the repair profile).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for repairing a hollow profile with a repair profile via an adhesive-distributing device, the method comprising the acts of:

a. providing the adhesive-distributing device with an outer contour that corresponds to an inner contour of the hollow profile to be repaired and the repair profile, which outer contour has a smaller cross-section than the inner contour;
b. introducing one or a plurality of wall-side openings into the hollow profile and/or repair profile corresponding to a number of existing injection openings of the adhesive-distributing device;
c. introducing the adhesive-distributing device with one each connecting section into the hollow profile as well as into the repair profile such that the wall-side openings are each in alignment with corresponding injection openings, forming a circumferential bonding gap;
d. injecting an adhesive via the injection openings into channel systems arranged in an adapter body of the adhesive-distributing device until the bonding gap is completely filled with adhesive, wherein each channel system has a first vertical channel, a second vertical channel, a first horizontal channel, and a second horizontal channel, wherein the first vertical channel, the second vertical channel, the first horizontal channel, and the second horizontal channel meet at a joint junction, wherein at least one of the first vertical channel, the second vertical channel, the first horizontal channel, and the second horizontal channel is connected to a respective injection opening, and wherein each of the first vertical channel, the second vertical channel, the first horizontal channel, and the second horizontal channel has a respective exit opening in a respective lateral surface of the adapter body.

2. The method according to claim 1, wherein the act (c) of introducing the adhesive-distributing device further comprises the acts of:
  (i) in a first act, introducing the adhesive-distributing device completely into one of the hollow profile or the repair profile;
  (ii) in a second act, positioning the hollow profile and the repair profile with face ends flush to one another; and
  (iii) in a third act, displacing the adhesive-distributing device into the other of the hollow profile or repair profile such that the openings are in alignment with respective corresponding injection openings and form a circumferential bonding gap.

3. The method according to claim 1, wherein the openings have a larger opening cross-section than the corresponding injection openings so that, directly after filling the bonding gap in act (d), adhesive escapes from the openings.

4. The method according to claim 1, wherein the first and the second horizontal channels are not disposed centrally within the adapter body and are disposed within an upper third of the adapter body.

* * * * *